(12) United States Patent
Morishita

(10) Patent No.: US 6,187,702 B1
(45) Date of Patent: Feb. 13, 2001

US006187702B1

(54) OPHTHALMIC AND OPTICAL GLASSES

(75) Inventor: Michiko Morishita, Sagamihara (JP)

(73) Assignee: Kabushiki Kaisha Ohara (JP)

( * ) Notice: Under 35 U.S.C. 154(b), the term of this patent shall be extended for 0 days.

(21) Appl. No.: 09/409,012

(22) Filed: Sep. 29, 1999

(30) Foreign Application Priority Data

Oct. 2, 1998 (JP) .................................................. 10-296064

(51) Int. Cl.$^7$ ............................ C03C 3/066; C03C 3/068
(52) U.S. Cl. .................. 501/78; 501/79; 501/901
(58) Field of Search .................. 501/78, 79, 901

(56) References Cited

U.S. PATENT DOCUMENTS

| | | | | |
|---|---|---|---|---|
| 3,958,999 | * | 5/1976 | Izumitani et al. | 501/78 |
| 4,120,732 | * | 10/1978 | Komorita et al. | 501/78 |
| 4,166,746 | * | 9/1979 | Ishibashi et al. | 501/78 |
| 4,226,627 | * | 10/1980 | Inoue et al. | 501/78 |
| 4,612,295 | * | 9/1986 | Sagara | 501/78 |

FOREIGN PATENT DOCUMENTS

| | | |
|---|---|---|
| 3201346 | 7/1983 | (DE) . |
| 4242859 | 2/1994 | (DE) . |
| 0570687 | 11/1993 | (EP) . |
| 52-155614 | 12/1977 | (JP) . |
| 60-221338 | 11/1985 | (JP) . |
| 9832706 | 7/1998 | (WO) . |

* cited by examiner

*Primary Examiner*—Mark L. Bell
*Assistant Examiner*—David Sample
(74) *Attorney, Agent, or Firm*—Hedman, Gibson & Costigan, P.C.

(57) ABSTRACT

Ophthalmic and optical glasses have a composition in weight percent of 4.5–9.5% $SiO_2$, 10–19.5% $B_2O_3$, 0–3% $Al_2O_3$, 0–5% $GeO_2$, 18—less than 23% $La_2O_3$, 0.3—less than 2% $Gd^2O_3$, 5.5–13.5% $TiO_2$, 0–7.5% $ZrO_2$, 15–21% $Nb_2O_5$, 0–1.5% $Ta_2O_5$, 0.3–5% $WO_3$, with the proviso that $(Ta_2O_5+WO_3)/B_2O_3$ is 0.5 or below in the ration terms of weight, 2.1–10% ZnO, 0–5% MgO, 7–12.5% CaO, 0–5% SrO, 0–4% BaO, $\geq 0.1\%$ $Li_2O+Na_2O+K_2O$ in which 0–1% $Li_2O$, 0–1% $Na_2O$ and 0–1% $K^2O$, 0–0.5% $As_2O_3$ and 0–0.5% $Sb_2O_3$ and have a specific gravity of 4.1 or below, and optical constants of a refractive index (nd) exceeding 1.88 and up to 1.93 and an Abbe number j(v d) within a range from 28 to 31. A preferable range of $Nb_2O_5$ is 15.5—less than 20.5% and a more preferable range of $Nb^2O_5$ is less 15.5–20%.

9 Claims, No Drawings

OPHTHALMIC AND OPTICAL GLASSES

The present application claims priority to Japanese Application Ser. No. 10-296064 filed Oct. 2, 1998.

BACKGROUND OF THE INVENTION

This invention relates to ophthalmic and optical glasses having a low specific gravity and a refractive index (nd) higher than 1.88.

In the past, glasses having a low refractive index (nd) of about 1.52 have been widely used for ophthalmic lenses. In a case where positive power or negative power lenses having a high diopter value are made of a glass having such a low refractive index, the thickness of the lenses in the edge or in the center increases with resulting increase in the weight of the lenses and also increase in chromatic aberration which produces iris in the edge of the lenses. These lenses are disadvantageous to the wearer of the spectacles both in use and appearance. For reducing the thickness of lenses having a high diopter value, glasses having a high refractive index (nd) of about 1.9 may be used. As one of such glasses having a high refractive index, Japanese Patent Application Laid-open Publication No. Sho 52-155614 discloses an optical glass of a $B_2O_3$—$La_2O_3$—$Gd_2O_3$—$WO_3$—$Zro_2$ and/or $Ta_2O_5$ system. This glass, however, contains a relatively large total amount of $Gd_2O_3$, $WO_3$ and $Ta_2O_5$ resulting in a high specific gravity and, therefore, this glass cannot sufficiently reduce the weight of the lenses. Moreover, this glass tends to be colored and has not sufficient resistance to devitrification. Japanese Patent Application Laid-open Publication No. Sho 48-23809 discloses a high refractive optical glass in which $TiO_2$, $ZrO_2$ and $Nb_2O_5$ are added to a $B_2O_3$—$La_2O_3$—$Gd_2O_3$—$Ta_2O_5$—$ZnO$ system glass. This glass, however, contains a relatively large amount of $La_2O_3$ resulting in a high specific gravity and, moreover, is not sufficient in acid-proof property and resistance to devitrification. Japanese Patent Application Laid-open Publication No. Sho 53-4023 discloses a high refractive optical glass in which $HfO_2$ is introduced into a $B_2O_3$—$La_2O_3$ system glass. This glass also has a high specific gravity because it contains a large amount of $La_2O_3$ and $HfO_2$. Besides, since $HfO_2$ is a very expensive material, this glass is not suited for a large scale production.

Japanese Patent Application Laid-open Publication No. Hei 6-56462, Japanese Patent Application Laid-open Publication No. Hei 6-87628 and International Application Laid-open Publication WO98/32706 also disclose low density and high refractive glasses but these glasses do not have a sufficient stability against devitrification and therefore are not suited for a large scale production.

Japanese Patent Application Laid-open Publication No. Sho 62-100449 discloses a g lass of a $B_2O_3$—$La_2O_3$—$ZnO$—$Li_2O$—$Sb_2O_3$ system. This glass, however, has a low refractive index and, besides, since it contains a large amount of $Sb_2O_3$, the $Sb_2O_3$ ingredient evaporates in melting of the glass and, as a result, it is difficult to obtain a homogeneous glass.

It is, therefore, an object of the present invention to provide ophthalmic and optical glasses which have eliminated the above described disadvantages of the prior art glasses and have a low specific gravity, a high refractive index and sufficient homogeneity a nd resistance to devitrification.

SUMMARY OF THE INVENTION

For achieving the object of the invention, repeated studies and experiments made by the inventor of the present invention have resulted in the finding, which has led to the present invention, that, by selecting a composition within specific content ranges of a $SiO_2$—$B_2O_2$—$La_2O_3$—$Gd_2O_3$—$TiO_2$—$Nb_2O_5$—$WO_3$—$ZnO$—$CaO$—$R_2$) ($R_2O$ being one or more oxides selected from the group consisting of $Li_2O$, $Na_2O$ and $K_2O$) system glass which has never been disclosed in the above described prior art glasses, glasses which, while maintaining a high refractive index, a low specific gravity and excellent chemical durability, have remarkably improved resistance to devitrification and excellent homogeneity and very suitable for a large scale production.

According to the invention, there are provided ophthalmic and optical glasses having the following composition expressed in weight percent on the oxide basis:

| | |
|---|---|
| $SiO_2$ | 4.5–9.5% |
| $B_2O_3$ | 10–19.5% |
| $Al_2O_3$ | 0–3% |
| $GeO_2$ | 0–5% |
| $La_2O_3$ | 18–less than 23% |
| $Gd_2O_3$ | 0.3–less than 2% |
| $TiO_2$ | 5.5–13.5% |
| $ZrO_2$ | 0–7.5% |
| $Nb_2O_5$ | 15–21% |
| $Ta_2O_5$ | 0–1.5% |
| $WO_3$ | 0.3–5% | with the proviso that $(Ta_2O_5+WO_3)/B_2O_3$ is 0.5 or below in the ratio in terms of weight

| | |
|---|---|
| $ZnO$ | 2.1–10% |
| $MgO$ | 0–5% |
| $CaO$ | 7–12.5% |
| $SrO$ | 0–5% |
| $BaO$ | 0–4% |
| $Li_2O + Na_2O + K_2O$ | $\geq 0.1\%$ |
| in which $Li_2O$ | 0–1% |
| $Na_2O$ | 0–1% |
| $K_2O$ | 0–1% |
| $As_2O_3$ | 0–0.5% |
| $Sb_2O_3$ | 0–0.5% | and having a specific gravity of 4.1 or below.

In one aspect of the invention, there are provided ophthalmic and optical glasses having the following composition in weight percent:

| | |
|---|---|
| $SiO_2$ | 4.5–9.5% |
| $B_2O_3$ | 10–19.5% |
| $Al_2O_3$ | 0–3% |
| $GeO_2$ | 0–5% |
| $La_2O_3$ | 18–less than 23% |
| $Gd_2O_3$ | 0.3–less than 2% |
| $TiO_2$ | 5.5–13.5% |
| $ZrO_2$ | 0–7.5% |
| $Nb_2O_5$ | 15.5–less than 20.5% |
| $Ta_2O_5$ | 0–1.5% |
| $WO_3$ | 0.3–5% | with the proviso that $(Ta_2O_5+WO_3)/B_2O_3$ is 0.5 or below in the ratio in terms of weight

| | |
|---|---|
| $ZnO$ | 2.1–10% |
| $MgO$ | 0–5% |

-continued

| | |
|---|---|
| CaO | 7–12.5% |
| SrO | 0–5% |
| BaO | 0–4% |
| $Li_2O + Na_2O + K_2O$ | ≧0.1% |
| in which $Li_2O$ | 0–1% |
| $Na_2O$ | 0–1% |
| $K_2O$ | 0–1% |
| $As_2O_3$ | 0–0.5% |
| $Sb_2O_3$ | 0–0.5% | and having a specific gravity of 4.1 or below.

In another aspect of the invention, there are provided ophthalmic and optical glasses having the following composition in weight percent:

| | |
|---|---|
| $SiO_2$ | 4.5–9.5% |
| $B_2O_3$ | 10–19.5% |
| $Al_2O_3$ | 0–3% |
| $GeO_2$ | 0–5% |
| $La_2O_3$ | 18–less than 23% |
| $Gd_2O_3$ | 0.3–less than 2% |
| $TiO_2$ | 5.5–13.5% |
| $ZrO_2$ | 0–7.5% |
| $Nb_2O_5$ | 15.5–20% |
| $Ta_2O_5$ | 0–1.5% |
| $WO_3$ | 0.3–5% | with the proviso that $(Ta_2O_5+WO_3)/B_2O_3$ is 0.5 or below in the ratio in terms of weight

| | |
|---|---|
| ZnO | 2.1–10% |
| MgO | 0–5% |
| CaO | 7–12.5% |
| SrO | 0–5% |
| BaO | 0–4% |
| $Li_2O + Na_2O + K_2O$ | ≧0.1% |
| in which $Li_2O$ | 0–1% |
| $Na_2O$ | 0–1% |
| $K_2O$ | 0–1% |
| $As_2O_3$ | 0–0.5% |
| $Sb_2O_3$ | 0–0.5% | and having a specific gravity of 4.1 or below.

In another aspect of the invention, there are provided ophthalmic and optical glasses having any of the above described compositions and having optical constants of a refractive index (nd) exceeding 1.88 and up to 1.93 and an Abbe number (vd) within a range from 28 to 31.

In still another aspect of the invention, there are provided ophthalmic and optical glasses having any of the above described compositions and having optical constants of a refractive index (nd) exceeding 1.88 and up to 1.93 and an Abbe number (vd) within a range from 28 to less than 30.4.

DETAILED DESCRIPTION OF THE INVENTION

Reasons for restricting the content ranges of the respective ingredients of the ophthalmic and optical glasses according to the present invention will now be described.

In the glasses of the present invention, the $B_2O_3$ ingredient is an important ingredient which has been found to afford capability of introducing $La_2O_3$, $Nb_2O_5$ and $TiO_2$ which impart a high refractivity to the glass while maintaining sufficient resistance to devitrification. If, however, the amount of this ingredient is below 10%, tendency to devitrification increases significantly with the result that the glass becomes sharply instable. If the amount of this ingredient exceeds 19.5%, a high refractivity which is a target of the present invention cannot be achieved.

The $SiO_2$ ingredient is required in the amount of 4.5% or more for maintaining chemical durability of the glass and optimum viscosity during forming. If, however, the amount of this ingredient exceeds 9.5%, an unmelted residue is produced and, as a result, a homogeneous glass cannot be obtained.

The CaO ingredient is effective in reducing the specific gravity of the glass and improving chemical durability of the glass and, for these purposes, 7% or more of this ingredient is required. If the amount of this ingredient exceeds 12.5%, tendency to phase separation of the glass increases with resulting deterioration in homogeneity.

The $Gd_2O_3$ ingredient is an ingredient which is very effective in preventing the devitrification tendency of the glass and this ingredient is required in the amount of 0.3% or more. For preventing the specific gravity of the glass from becoming excessively large for the purpose of the invention while achieving this effect, the amount of this ingredient should be restricted to less than 2%.

The $La_2O_3$ ingredient is effective in imparting high refractive, low dispersion characteristics to the glass and improving resistance to devitrification in cooperation with the $Gd_2O_3$ ingredient and hence is an important ingredient. If the amount of this ingredient is below 18%, the desired high refractive, low dispersion characteristics cannot be obtained. If the amount of this ingredient is 23% or over, the effect obtainable by the cooperation with the $Gd_2O_3$ ingredient cannot be obtained but resistance to devitrification is deteriorated rather than is improved and, besides, the specific gravity of the glass increases. For obtaining a stable glass having sufficient resistance to devitrification, the amount of this ingredient should preferably be 22.9% or less.

The $Ta_2O_5$ ingredient is effective in increasing the refractive index of the glass and improving chemical durability thereof. For preventing increase in the raw material cost of the glass, it will suffice if this ingredient is added up to 1.5%.

The $WO_3$ ingredient should be added in the amount of 0.3% or over for maintaining the desired optical constants and preventing devitrification. If the amount of this ingredient exceeds 5%, coloration of the glass increases and resistance to devitrification is deteriorated rather than is improved. If the ratio in terms of weight of the total amount of $Ta_2O_5$ and $WO_3$ to the amount of $B_2O_3$ exceeds 0.5, the specific gravity and/or coloration of the glass increases and resistance to devitrification is significantly deteriorated. For these reasons, the ratio in terms of weight of the total amount of $Ta_2O_5$ and $WO_3$ to the amount of $B_2O_3$ should be 0.5 or below.

The $TiO_2$ ingredient is effective in increasing the refractive index of the glass and decreasing the specific gravity of the glass. If the amount of this ingredient is below 5.5%, these effects cannot be sufficiently achieved whereas if the amount of this ingredient exceeds 13.5%, resistance to devitrification decreases and coloration of the glass increases and, besides, the value of vd becomes smaller than the target range.

It has been found that, in the present invention, the ZnO ingredient is a very important ingredient in that, when it coexists with the $Gd_2O_3$ ingredient and the $WO_3$ ingredient, it prevents occurrence of devitrification quite effectively. If the amount of this ingredient is below 2.1%, this effect cannot be sufficiently achieved whereas if the amount of this ingredient exceeds 10%, resistance to devitrification increases rather than decreases. It is up to 5% that this effect is remarkably achieved.

The $Nb_2O_5$ ingredient is effective in maintaining the desired high refractivity and low specific gravity and improving chemcial durability of the glass. For achieving these effects, addition of this ingredient in the amount of 15.5% or over is necessary. If the amount of this ingredient exceeds 21%, an unmelted residue of this ingredient is produced resulting in serious deterioration in homogeneity of the glass and resistance to devitrification. For obtaining a glass which have excellent homogeneity, melting property and resistance to devitrification, the amount of this ingredient should preferably be below 20.5% and, for obtaining a glass having a particularly excellent homogeneity and resistance to devitrification, the amount of this ingredient should be 20% or below.

The $Li_2O$, $Na_2O$ and $K_2O$ ingredients are effective in improving melting property of the glass. If the total amount of one or more of these three ingredients is below 0.1%, the melting property of the glass is significantly deteriorated with the result that a homogeneous glass cannot be obtained and, moreover, the temperature at which devitrification occurs rises. For preventing the tendency to devitrification and producing a homogeneous glass, the total amount of one or more of these three ingredients should be 0.1% or over. Addition of each of the $Li_2O$, $Na_2O$ and $K_2O$ ingredients in excess of 1% is not preferable because if the amount of each of these ingredients exceeds 1%, the tendency to devitrification increases rather than decreases.

The $Al_2O_3$ ingredient is effective in increasing viscosity in melting of the glass and preventing devitrification and phase separation. If the amount of this ingredient exceeds 3%, the tendency to devitrification increases rather than decreases. The $GeO_2$ ingredient is effective in preventing devitrification and maintaining the desired optical constants. This material, however, is expensive and, therefore, addition of this ingredient should be restricted within an amount up to 5%.

The $ZrO_2$ ingredient is effective in preventing devitrification, improving chemical durability and increasing the refractive index. If the amount of this ingredient exceeds 7.5%, the tendency to devitrification increases rather than decreases and therefore addition of this ingredient in excess of 7.5% is not preferable.

The MgO, SrO and BaO ingredients may be added for adjusting the optical constants. For preventing deterioration in chemical durability, addition of these ingredients should be restricted within ranges up to 5%, 5% and 4% respectively.

The $As_2O_3$ and $Sb_2O_3$ ingredients may optionally be added as a refining agent. Addition of each of these ingredients up to 0.5% will suffice. Particularly, if the amount of $Sb_2O_3$ exceeds 0.5%, coloration of the glass increases significantly.

In addition to the above described ingredients, a small amount of known oxides and sulfides of elements such as Fe, Ni, Cr, Co, Mn, Cu, Nd, Pr and Ce may be added, if necessary, as a coloring agent.

EXAMPLES

The following Tables 1 to 3 show compositions of Examples (No. 1 to No. 13) of the ophthalmic and optical glasses of the present invention and Comparative Examples (A to F) of the prior art high refractive glasses together with refractive index (nd), Abbe number (vd), specific gravity and results of the devitrification test (indicated as "dev. test" in the tables) of these Exmples and Comparative Examples.

In the devitrification test, 150 g of batch glass materials was placed in a 50 cc platinum pot and melted in an electric furnace at 1200° C.–1300° C. for five hours depending upon the melting property of each specimen. Then, the temperature was lowered and each glass specimen was held at 1120° C. and 1070° C. for five hours. The glass specimens then were taken out of the furnace and presence or absence of devitrification was observed with a microscope. The glass specimen in which devitrification was not observed as a result of the observation is marked with the ○ mark and the glass specimen in which devitrification was observed is marked with the X mark in the tables.

TABLE 1

| Example No. | 1 | 2 | 3 | 4 | 5 | 6 | 7 |
|---|---|---|---|---|---|---|---|
| | weight % | | | | | | |
| $SiO_2$ | 4.60 | 9.50 | 7.00 | 6.00 | 5.20 | 5.80 | 8.00 |
| $B_2O_3$ | 19.20 | 11.00 | 17.0 | 16.00 | 14.70 | 14.10 | 16.80 |
| $Al_2O_3$ | | 1.50 | | | | 1.00 | |
| $GeO_2$ | | 4.00 | | | 3.00 | 4.00 | |
| $La_2O_3$ | 22.80 | 21.3 | 22.00 | 20.60 | 20.00 | 22.10 | 22.60 |
| $Gd_2O_3$ | 1.50 | 0.30 | 1.50 | 2.00 | 1.70 | 1.90 | 0.50 |
| $TiO_2$ | 9.30 | 13.40 | 10.00 | 12.00 | 9.60 | 5.70 | 9.75 |
| $ZrO_2$ | 7.30 | 7.00 | 3.00 | 7.00 | 7.40 | 7.40 | 7.30 |
| $Nb_2O_5$ | 20.40 | 18.50 | 19.00 | 20.00 | 19.0 | 20.00 | 19.65 |
| $Ta_2O_5$ | | | | | | 1.20 | |
| $WO_3$ | 0.50 | 2.20 | 2.50 | 0.50 | 0.60 | 0.90 | 0.50 |
| ZnO | 2.80 | 4.00 | 6.50 | 2.85 | 2.70 | 2.20 | 2.50 |
| MgO | | | 3.40 | 2.00 | 4.7 | 4.80 | |
| CaO | 11.05 | 7.00 | 7.00 | 8.50 | 9.00 | 8.70 | 11.85 |
| SrO | | | 1.00 | 1.00 | 1.20 | | |
| $Li_2O$ | 0.50 | | 0.10 | 1.00 | 1.00 | 0.20 | 0.50 |
| $Na_2O$ | | | | | 0.50 | 0.15 | |
| $K_2O$ | | 0.30 | | | | | |
| $As_2O_3$ | | | | 0.05 | | | 0.05 |
| $Sb_2O_3$ | 0.05 | | | | | | |
| $Li_2O + Na_2O + K_2O$ | 0.50 | 0.30 | 0.10 | 1.50 | 1.15 | 0.20 | 0.50 |
| $(Ta_2O_5 + WO_3)/B_2O_3$ | 0.03 | 0.20 | 0.15 | 0.03 | 0.04 | 0.15 | 0.03 |
| nd | 1.894 | 1.915 | 1.883 | 1.900 | 1.885 | 1.881 | 1.885 |
| vd | 30.3 | 28.1 | 29.2 | 29.0 | 29.5 | 29.8 | 30.2 |
| specific gravity | 4.01 | 4.04 | 4.02 | 3.99 | 4.03 | 4.09 | 3.99 |
| dev. test (1120° C.) | ○ | ○ | ○ | ○ | ○ | ○ | ○ |
| dev. test (1070° C.) | ○ | ○ | ○ | ○ | ○ | ○ | ○ |

TABLE 2

| Example No. | 8 | 9 | 10 | 11 | 12 | 13 | 14 | 15 |
|---|---|---|---|---|---|---|---|---|
| | weight % | | | | | | | |
| $SiO_2$ | 5.80 | 7.00 | 9.30 | 5.80 | 7.00 | 8.00 | 8.00 | 8.00 |
| $B_2O_3$ | 16.70 | 15.50 | 12.70 | 11.70 | 15.50 | 14.00 | 17.00 | 16.80 |
| $GeO_2$ | | 2.00 | 4.50 | 5.00 | 2.00 | | | |
| $La_2O_3$ | 19.50 | 22.90 | 19.00 | 18.50 | 22.90 | 19.50 | 22.60 | 22.70 |
| $Gd_2O_3$ | 0.40 | 1.50 | 0.50 | 1.40 | 1.50 | 1.00 | 0.50 | 0.50 |
| $TiO_2$ | 13.30 | 9.80 | 9.00 | 13.40 | 9.80 | 13.50 | 9.90 | 9.65 |
| $ZrO_2$ | 7.40 | 7.50 | 6.00 | 7.40 | 7.50 | 4.50 | 7.00 | 7.30 |
| $Nb_2O_5$ | 19.50 | 15.70 | 19.50 | 19.80 | 15.70 | 18.30 | 20.40 | 19.65 |
| $Ta_2O_5$ | 1.00 | | 1.00 | 1.00 | | 1.50 | | |
| $WO_3$ | 0.50 | 1.00 | 3.00 | 0.50 | 1.00 | 4.00 | 0.50 | 0.50 |
| ZnO | 2.20 | 3.50 | 6.50 | 2.20 | 3.50 | 3.55 | 2.10 | 2.50 |
| MgO | 1.20 | 3.05 | | | 3.05 | 1.00 | 0.50 | |
| CaO | 11.50 | 9.35 | 8.50 | 12.30 | 9.00 | 10.60 | 11.00 | 11.85 |
| BaO | | 0.50 | | | 0.50 | | | |
| $Li_2O$ | 1.00 | 0.25 | | | 0.25 | 0.50 | 0.50 | 0.50 |
| $Na_2O$ | | | 0.50 | | | | | |
| $K_2O$ | | 0.45 | | 0.50 | 0.80 | | | |
| $As_2O_3$ | | | | 0.50 | | 0.05 | | 0.05 |
| $Li_2O +$ | 1.00 | 0.70 | 0.50 | 0.50 | 0.80 | 0.50 | 0.50 | 0.50 |

TABLE 2-continued

| | weight % | | | | | | | |
|---|---|---|---|---|---|---|---|---|
| Example No. | 8 | 9 | 10 | 11 | 12 | 13 | 14 | 15 |
| $Na_2O + K_2O$ | | | | | | | | |
| $(Ta_2O_5 + WO_3)/B_2O_3$ | 0.09 | 0.06 | 0.31 | 0.13 | 0.06 | 0.39 | 0.03 | 0.03 |
| nd | 1.910 | 1.881 | 1.885 | 1.929 | 1.881 | 1.906 | 1.886 | 1.885 |
| vd | 28.7 | 30.3 | 30.1 | 28.2 | 30.3 | 28.2 | 31.0 | 30.2 |
| specific gravity | 3.94 | 4.02 | 4.04 | 4.06 | 4.02 | 4.00 | 3.93 | 3.99 |
| dev. test (1120° C.) | ○ | ○ | ○ | ○ | ○ | ○ | ○ | ○ |
| dev. test (1070° C.) | ○ | ○ | ○ | ○ | ○ | ○ | ○ | ○ |

TABLE 3

| | weight % Comparative Examples | | | | | |
|---|---|---|---|---|---|---|
| No. | A | B | C | D | E | F |
| $SiO_2$ | 6.50 | 4.60 | 6.10 | 6.10 | 7.30 | |
| $B_2O_3$ | 16.71 | 16.40 | 17.50 | 18.00 | 16.65 | 25.00 |
| $Al_2O_3$ | 0.20 | | | | | |
| $La_2O_3$ | 25.32 | 36.00 | 21.20 | 22.60 | 24.00 | 29.00 |
| $Gd_2O_3$ | | 2.00 | | | | 5.00 |
| $TiO_2$ | 7.81 | | 7.50 | 7.50 | 8.60 | 2.50 |
| $ZrO_2$ | 7.00 | 3.50 | 9.20 | 9.10 | 8.20 | 5.00 |
| $Nb_2O_5$ | 21.82 | | 23.40 | 23.20 | 21.20 | 26.00 |
| $Ta_2O_5$ | | 17.50 | | | | 2.50 |
| $WO_3$ | | 18.50 | | | | |
| ZnO | | | | 5.00 | | 5.00 |
| CaO | 14.21 | | 15.10 | 8.50 | 14.00 | |
| SrO | | 1.50 | | | | |
| BaO | 0.10 | | | | | |
| $Na_2O$ | 0.05 | | | | | |
| $K_2O$ | 0.10 | | | | | |
| $P_2O_5$ | 0.15 | | | | | |
| $As_2O_3$ | | | | | 0.05 | |
| $F_2O$ | 0.03 | | | | | |
| F | 0.06 | | | | | |
| $(Ta_2O_5 + WO_3)/B_2O_3$ | 0 | 2.20 | 0 | 0 | 0 | 0.10 |
| nd | 1.881 | 1.850 | 1.884 | 1.889 | 1.883 | 1.897 |
| vd | 31.0 | 31.2 | 30.5 | 29.6 | 30.4 | 29.9 |
| specific gravity | 4.00 | 5.30 | 3.96 | 4.05 | 3.98 | 4.39 |
| dev. test (1120° C.) | X | ○ | X | ○ | ○ | ○ |
| dev. test (1070° C.) | X | X | X | X | X | X |

As will be apparent from Table 3, devitrification was observed in all of the glasses of the Comparative Examples. Moreover, the glasses of Comparative Examples B and F have a very large specific gravity. In contrast, the glasses of the Examples of the present invention are low specific gravity, high refractive glasses all having a specific gravity of 4.1 or below and optical constants within specific ranges. Besides, devitrification was not observed in any of the glasses of the Examples, exhibiting resistance to devitrification which is superior to the glasses of the Comparative Examples.

The glasses of the above described Examples of the invention can be obtained easily by weighing and mixing normal materials for optical glasses such as oxides, carbonates and nitrates at a predetermined ratio, placing the mixed materials in a platinum crucible and melting them at a temperature within a range of 1200° C.–1300° C. for three to five hours depending upon the melting property of the glass composition, defoaming and stirring the melt to homogenize it, and placing the melt in a mold after lowering the temperature to anneal it.

As described in the foregoing, the ophthalmic and optical glasses of the present invention are glasses of a $SiO_2$—$B_2O_3$—$La_2O_3$—$Gd_2O_3$—$TiO_2$—$Nb_2O_5$—$WO_3$—ZnO—CaO—$R_2O$ system within specific composition ranges and have a low specific gravity and a high refractive index and excellent chemical durability. Moreover, the ophthalmic and optical glasses of the invention have sufficient resistance to devitrification and excellent homogeneity. Furthermore, the materials of the glasses of the present invention are relatively inexpensive and, therefore, the glasses of the present invention are suitable for a large scale production. The glasses of the invention are suited for ophthalmic glasses and can be also utilized for various applications as high refractive, lightweight optical glasses.

What is claimed is:

1. Ophthalmic and optical glasses having the following composition in weight percent:

| | |
|---|---|
| $SiO_2$ | 4.5–9.5% |
| $B_2O_3$ | 10–19.5% |
| $Al_2O_3$ | 0–3% |
| $GeO_2$ | 0–5% |
| $La_2O_3$ | 18–less than 23% |
| $Gd_2O_3$ | 0.3–less than 2% |
| $TiO_2$ | 5.5–13.5% |
| $ZrO_2$ | 0–7.5% |
| $Nb_2O_5$ | 15–21% |
| $Ta_2O_5$ | 0–1.5% |
| $WO_3$ | 0.3–5% | with the proviso that $(Ta_2O_5+WO_3)/B_2O_3$ is 0.5 or below in the ratio in terms of weight

| | |
|---|---|
| ZnO | 2.1–10% |
| MgO | 0–5% |
| CaO | 7–12.5% |
| SrO | 0–5% |
| BaO | 0–4% |
| $Li_2O + Na_2O + K_2O$ | ≧0.1% |
| in which $Li_2O$ | 0–1% |
| $Na_2O$ | 0–1% |
| $K_2O$ | 0–1% |
| $As_2O_3$ | 0–0.5% |
| $Sb_2O_3$ | 0–0.5% | and having a specific gravity of 4.1 or below.

2. Ophthalmic and optical glasses as defined in claim 1 having optical constants of a refractive index (nd) exceeding 1.88 and up to 1.93 and an Abbe number (vd) within a range from 28 to 31.

3. Ophthalmic and optical glasses as defined in claim 1 having optical constants of a refractive index (nd) exceeding 1.88 and up to 1.93 and an Abbe number (vd) within a range from 28 to less than 30.4.

4. Ophthalmic and optical glasses having the following composition in weight percent:

| | |
|---|---|
| $SiO_2$ | 4.5–9.5% |
| $B_2O_3$ | 10–19.5% |
| $Al_2O_3$ | 0–3% |
| $GeO_2$ | 0–5% |
| $La_2O_3$ | 18–less than 23% |
| $Gd_2O_3$ | 0.3–less than 2% |

-continued

| | |
|---|---|
| TiO$_2$ | 5.5–13.5% |
| ZrO$_2$ | 0–7.5% |
| Nb$_2$O$_5$ | 15.5–less than 20.5% |
| Ta$_2$O$_5$ | 0–1.5% |
| WO$_3$ | 0.3–5% | with the proviso that (Ta$_2$O$_5$+WO$_3$)/B$_2$O$_3$ is 0.5 or below in the ratio in terms of weight

| | |
|---|---|
| ZnO | 2.1–10% |
| MgO | 0–5% |
| CaO | 7–12.5% |
| SrO | 0–5% |
| BaO | 0–4% |
| Li$_2$O + Na$_2$O + K$_2$O | ≧0.1% |
| in which Li$_2$O | 0–1% |
| Na$_2$O | 0–1% |
| K$_2$O | 0–1% |
| As$_2$O$_3$ | 0–0.5% |
| Sb$_2$O$_3$ | 0–0.5% | and having a specific gravity of 4.1 or below.

5. Ophthalmic and optical glasses as defined in claim 4 having optical constants of a refractive index (nd) exceeding 1.88 and up to 1.93 and an Abbe number (vd) within a range from 28 to 31.

6. Ophthalmic and optical glasses as defined in claim 4 having optical constants of a refractive index (nd) exceeding 1.88 and up to 1.93 and an Abbe number (vd) within a range from 28 to less than 30.4.

7. Ophthalmic and optical glasses having the following composition in weight percent:

| | |
|---|---|
| SiO$_2$ | 4.5–9.5% |
| B$_2$O$_3$ | 10–19.5% |
| Al$_2$O$_3$ | 0–3% |
| GeO$_2$ | 0–5% |
| La$_2$O$_3$ | 18–less than 23% |
| Gd$_2$O$_3$ | 0.3–less than 2% |
| TiO$_2$ | 5.5–13.5% |
| ZrO$_2$ | 0–7.5% |
| Nb$_2$O$_5$ | 15.5–20% |
| Ta$_2$O$_5$ | 0–1.5% |
| WO$_3$ | 0.3–5% | with the proviso that (Ta$_2$O$_5$+WO$_3$)/B$_2$O$_3$ is 0.5 or below in the ratio in terms of weight

| | |
|---|---|
| ZnO | 2.1–10% |
| MgO | 0–5% |
| CaO | 7–12.5% |
| SrO | 0–5% |
| BaO | 0–4% |
| Li$_2$O + Na$_2$O + K$_2$O | ≧0.1% |
| in which Li$_2$O | 0–1% |
| Na$_2$O | 0–1% |
| K$_2$O | 0–1% |
| As$_2$O$_3$ | 0–0.5% |
| Sb$_2$O$_3$ | 0–0.5% | and having a specific gravity of 4.1 or below.

8. Ophthalmic and optical glasses as defined in claim 7 having optical constants of a refractive index (nd) exceeding 1.88 and up to 1.93 and an Abbe number (vd) within a range from 28 to 31.

9. Ophthalmic and optical glasses as defined in claim 7 having optical constants of a refractive index (nd) exceeding 1.88 and up to 1.93 and an Abbe number (vd) within a range from 28 to less than 30.4.

* * * * *